(12) United States Patent
Perrin et al.

(10) Patent No.: US 11,495,850 B2
(45) Date of Patent: Nov. 8, 2022

(54) PROTECTIVE HOUSING OF A BATTERY PACK INCORPORATING CHANNELS FOR TRANSPORTING A HEAT-TRANSFER FLUID

(71) Applicant: Valeo Systemes Thermiques, Le Mesnil Saint Denis (FR)

(72) Inventors: Thibaut Perrin, La Suze sur Sarthe (FR); Mohamed Ibrahimi, La Suze sur Sarthe (FR); Bastien Jovet, Le Mesnil Saint Denis (FR); Sergio Da Costa Pito, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 183 days.

(21) Appl. No.: 16/753,119

(22) PCT Filed: Oct. 3, 2018

(86) PCT No.: PCT/FR2018/052438
§ 371 (c)(1),
(2) Date: Aug. 10, 2020

(87) PCT Pub. No.: WO2019/069022
PCT Pub. Date: Apr. 11, 2019

(65) Prior Publication Data
US 2020/0381792 A1 Dec. 3, 2020

(30) Foreign Application Priority Data
Oct. 4, 2017 (FR) ...................................... 1759281

(51) Int. Cl.
*H01M 10/6568* (2014.01)
*H01M 10/617* (2014.01)
(Continued)

(52) U.S. Cl.
CPC ......... *H01M 10/6568* (2015.04); *B60L 50/64* (2019.02); *H01M 10/617* (2015.04);
(Continued)

(58) Field of Classification Search
None
See application file for complete search history.

(56) References Cited

U.S. PATENT DOCUMENTS

2013/0344362 A1* 12/2013 Raisch .................... F28F 21/00
429/93
2015/0280295 A1 10/2015 Bhunia et al.
(Continued)

FOREIGN PATENT DOCUMENTS

EP           2228851 A1      9/2010
WO      WO2017/099293   *  6/2017
WO        2017149217 A1    9/2017

OTHER PUBLICATIONS

International Search Report and Written Opinion issued in corresponding International Patent Application No. PCT/FR2018/052438, dated Jan. 30, 2019 (13 pages).

*Primary Examiner* — Lisa S Park
(74) *Attorney, Agent, or Firm* — Osha Bergman Watanabe & Burton LLP

(57) ABSTRACT

The invention relates to a casing for protecting at least one electric battery module (M), comprising at least one element (9) for thermal regulation of said at least one module (M) in which a heat-transfer fluid flows.
According to the invention, the protective housing comprises at least one duct (10), for conveying heat-transfer fluid, that extends in at least one wall of the protective casing (B, 1, 2, 3, 4) and is in fluid connection with said at least one thermal regulation element (9).

4 Claims, 4 Drawing Sheets

(51) Int. Cl.
    *H01M 10/625* (2014.01)
    *H01M 10/6552* (2014.01)
    *H01M 50/10* (2021.01)
    *H01M 50/26* (2021.01)
    *B60L 50/64* (2019.01)
    *B60L 58/26* (2019.01)
    *B60L 58/27* (2019.01)
    *H01M 10/6556* (2014.01)

(52) U.S. Cl.
    CPC ..... *H01M 10/625* (2015.04); *H01M 10/6552* (2015.04); *H01M 10/6556* (2015.04); *H01M 50/10* (2021.01); *H01M 2220/20* (2013.01)

(56) References Cited

U.S. PATENT DOCUMENTS

2016/0344061 A1* 11/2016 Maguire ........... H01M 10/6554
2016/0351978 A1   12/2016 Nishimura et al.
2020/0266505 A1* 8/2020 Park ......................... C23C 2/06

* cited by examiner

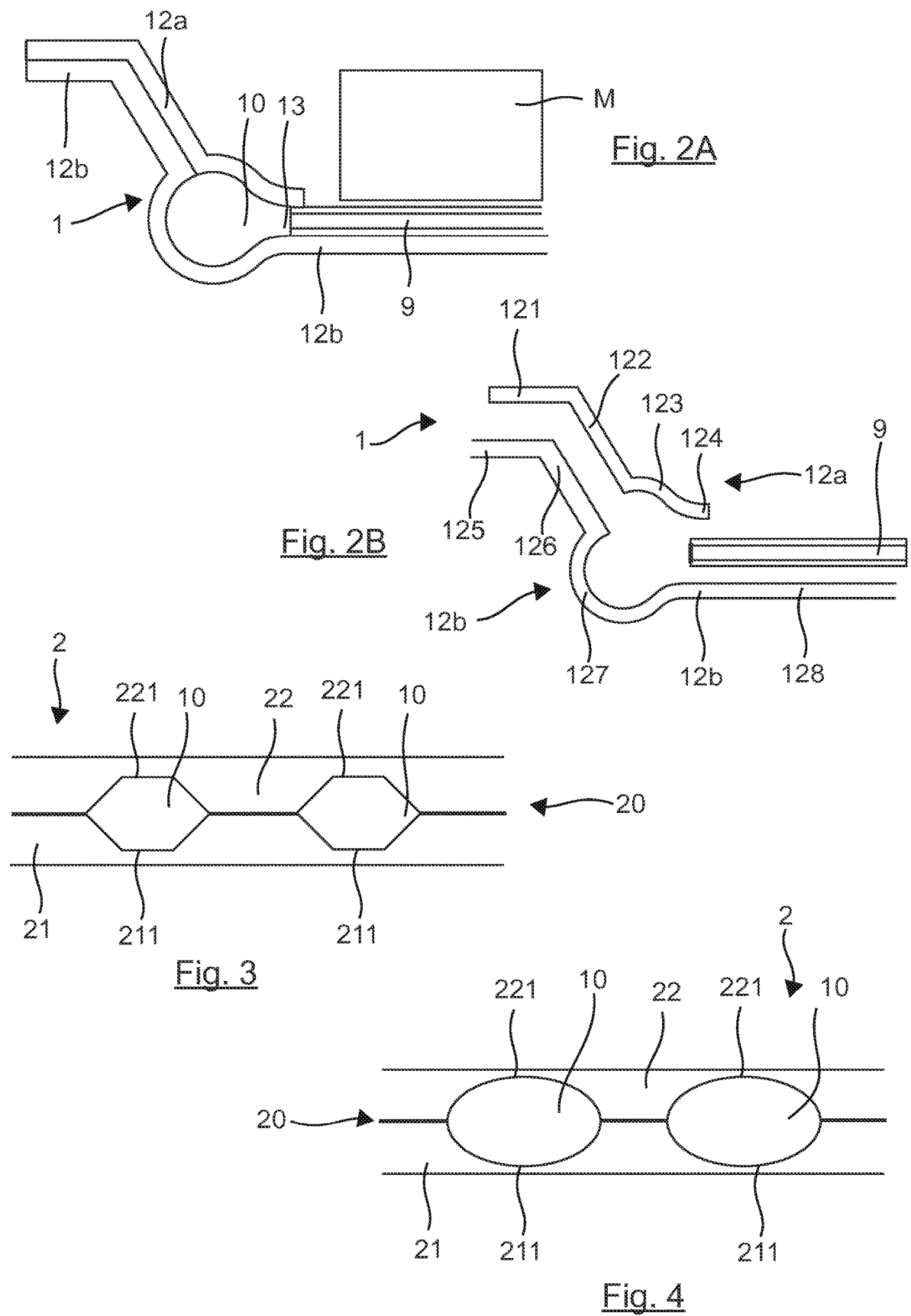

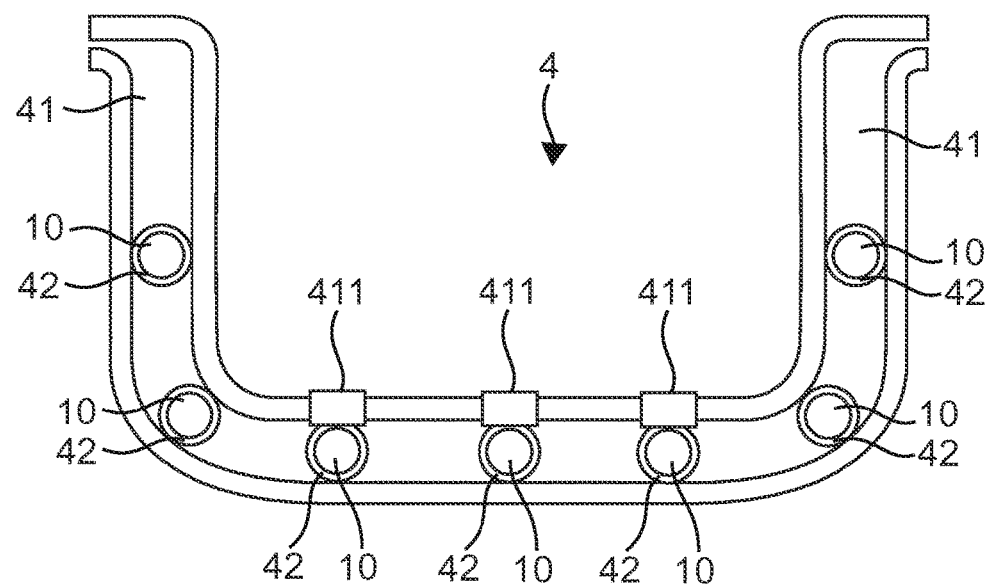
Fig. 8
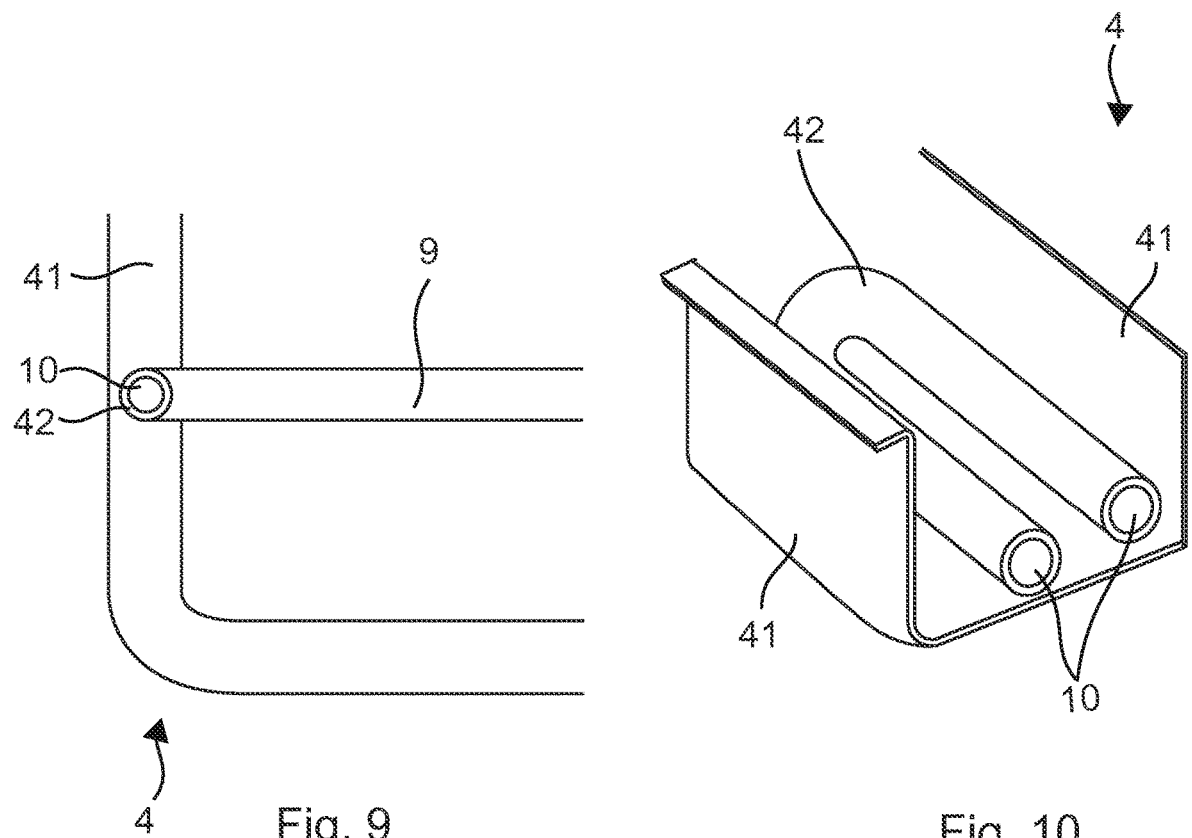
Fig. 9
Fig. 10

PROTECTIVE HOUSING OF A BATTERY PACK INCORPORATING CHANNELS FOR TRANSPORTING A HEAT-TRANSFER FLUID

1. FIELD OF THE INVENTION

The invention relates to the field of the thermal regulation of battery modules, notably for a motor vehicle with propulsion provided entirely or in part by an electric motor, which are located in a protective casing that, together with the battery modules, forms a battery pack.

More precisely, the invention relates to the structure of such a protective casing.

2. PRIOR ART

In the field if electric and hybrid vehicles, the electrical-energy storage cells are connected together in such a manner as to create an electric generator of the required voltage and capacity and are positioned in a battery module (termed "module" below).

A plurality of modules connected together form the vehicle battery.

These modules are generally enclosed in a rigid, sealed protective casing, manufactured from metal, which protects the modules from the outside environment.

The protective casing and the modules form an assembly that is generally called a "battery pack".

Motor-vehicle manufacturers are nowadays seeking to supply more powerful electric or hybrid vehicles that have an increased electric range.

To that end, an ever-increasing number of modules is being installed in vehicles.

The battery pack, which is generally arranged in the region of the vehicle floor, thus covers an increasingly large surface area of the vehicle floor and sometimes even forms the floor of the vehicle trunk.

Furthermore, when the vehicle is running, battery modules may experience temperature variations that can in certain cases damage or even destroy them.

Thermal regulation of the modules is therefore essential in order, on the one hand, to keep them in good condition and, on the other, to guarantee the reliability, range and performance level of the vehicle.

Devices designed to regulate the temperature of the modules are thus used with a view to optimizing the functioning of the modules.

Such a thermal regulation device has a heat-transfer fluid running through it and fulfils the functions of heating and/or cooling the modules.

The heat-transfer fluid can thus absorb the heat emitted by each module in order to cool the latter or, depending on requirements, it can supply heat to it if the temperature of the module is too low for it to function properly.

One or more thermal regulation devices (depending on the number of modules to be cooled) are generally positioned directly in contact with the modules (i.e. inside the battery pack).

Conveying, i.e. feeding, heat-transfer fluid to these thermal regulation devices, and the elimination thereof, is effected by means of a network of pipes arranged either inside the protective casing or outside of it.

A first drawback in terms of employing a network of pipes, be this inside or outside the protective casing, lies in the large number of components that this involves.

Indeed, a network of pipes is formed by a plurality of conveying tubes that are connected together mechanically.

The weight of the installation on board the vehicle is therefore significant, which is unsatisfactory.

Furthermore, such a network of pipes occupies a relatively large amount of space.

When the network of pipes is located inside the protective casing, the amount of space it occupies limits the space allocated for receiving the battery modules in the battery pack.

The power and the range of the vehicle in electric mode are thus not maximized.

When it is located outside the protective casing, the amount of space occupied by the network of pipes limits the space available for the installation and onboard fitting of the other vehicle components, which is likewise unsatisfactory.

Moreover, the mechanical connections between the conveying tubes of such a network increase the likelihood of leakage of the heat-transfer fluid into the interior enclosure of the battery pack and, as a result, the risk that the modules will be destroyed.

3. SUMMARY OF THE INVENTION

An object of the present invention is to solve these prior-art problems and proposes a casing for protecting at least one electric battery module, comprising at least one element for thermal regulation of said at least one module in which a heat-transfer fluid flows.

According to the invention, said protective housing comprises at least one duct, for conveying heat-transfer fluid, that extends in at least one wall of the protective casing and is in fluid connection with said at least one thermal regulation element.

The invention thus proposes to integrate the ducts for conveying the heat-transfer fluid actually inside the walls of the protective casing in which the electric battery modules are accommodated.

Thus, the casing makes it possible, on the one hand, to protect the battery modules from impacts and, on the other hand, to distribute the heat-transfer fluid to the thermal regulation elements employed in the interior enclosure of the casing and arranged in thermal contact with the modules such as to regulate the temperature of said modules.

The invention therefore integrates management of the heat-transfer fluid actually within the structure of the protective casing.

The structure of the casing and the ducts for conveying the heat-transfer fluid cannot thus be dissociated.

According to one aspect of the invention, the walls of the protective casing are formed from two half-shells, which, after assembly, delimit said at least one conveying duct.

Thus, the protective casing is obtained by means of assembly of two half-shells of complementary forms that make it possible, once assembled, to delimit cavities forming ducts for conveying the heat-transfer fluid actually within the wall of the casing.

It is relatively simple to implement ducts for conveying the heat-transfer fluid within the walls of the casing.

According to another aspect of the invention, said two half-shells are secured by welding, adhesive bonding or friction of said two half-shells together until adhesion is achieved.

These securing techniques make it possible to ensure that the half-shells of the casing are held together well while still guaranteeing the seal between the conveying ducts and the interior enclosure of the casing.

The battery modules are thus protected against impacts (crashes) and leakage of heat-transfer fluid in that the interior enclosure of the casing is kept sealed from the circuit for conveying the heat-transfer fluid that is located in the walls of the casing.

According to another aspect of the invention, a first half-shell comprises at least one groove and a second half-shell comprises at least one groove, said at least one grooves being arranged such that they face one another and delimiting said at least one conveying duct after assembly of the two half-shells.

Thus, the protective casing is obtained by means of assembly of two half-shells each having facing grooves, which, after assembly, delimit ducts for conveying the heat-transfer fluid actually within the wall of the casing.

According to one aspect of the invention, the two half-shells delimit, after assembly, at least one slot for receiving an edge of said at least one thermal regulation element, forming a fluid connection between the latter and said at least one conveying duct.

According to one aspect of the invention, the protective casing is a monobloc component.

The protective casing therefore comprises only a single part and so is easy to manufacture.

According to another aspect of the invention, said at least one duct for conveying the heat-transfer fluid is formed in said monobloc protective casing at the time of the manufacture thereof by means of one of the following methods: three-dimensional (3D) printing, pultrusion, lost wax molding, gas injection.

These manufacturing methods allow the conveying ducts to be provided directly in the walls of the casing, at the time of the manufacture thereof.

No other manufacturing step is therefore needed in order to delimit the ducts in the walls of the casing.

According to one aspect of the invention, at least one conveying duct is delimited by at least one conduit extending in said at least one wall of the protective casing.

The protective casing thus integrates one or more conduits actually within these walls delimiting the conveying ducts.

This solution makes it possible to limit the likelihood of leakage of the heat-transfer fluid in the interior enclosure of the protective casing.

The integration of dedicated conduits for conveying the heat-transfer within the walls of the casing enables the space allocated for receiving the battery modules in the interior enclosure of the casing to be maintained.

The thickness of the walls of the protective casing is not, or is only very slightly, increased as compared to know prior-art casings.

According to another aspect of the invention, said at least one conduit is thermoformed or overmolded within said at least one wall of said protective casing.

These thermoforming or overmolding techniques enable the conduits to be easily and inexpensively integrated within the walls of the casing for protecting the electric battery modules.

The invention further proposes a battery pack for a hybrid or electric vehicle, comprising a protective casing as described above, in which is accommodated at least one electric battery module thermally regulated by at least one thermal regulation element.

4. FIGURES

Other features and advantages of the invention will become more clearly apparent upon reading the following detailed description of particular embodiments of the invention, said description being given by way of simple, non-limiting illustrative examples, and the appended drawings, in which:

FIG. 1, which schematically illustrates the general principle of the invention, is a view from above, in cross section, of a battery pack employing a protective casing according to the invention;

FIG. 2A is a side view, in partial cross section, of a casing for protecting a battery pack according to a first embodiment of the invention;

FIG. 2B is an expanded view of the protective casing of FIG. 2A;

FIG. 3 is a schematic detailed view, in cross section, of a casing for protecting a battery pack according to a second embodiment of the invention;

FIG. 4 is a cross-sectional view illustrating a variant of the protective casing of FIG. 3;

FIG. 8 is a cross-sectional view illustrating, in part, a casing for protecting a battery pack according to a fourth embodiment of the invention;

FIG. 9 is another cross-sectional view illustrating, in part, the protective casing of FIG. 8; and FIG. 10 is a perspective view illustrating a variant of the protective casing of FIG. 8.

5. DETAILED DESCRIPTION OF EMBODIMENTS

The casing for protecting electric battery modules of the invention comprises, within one or more of its walls, integrated walls allowing the conveying of a heat-transfer fluid to one or more devices for thermal regulation of the electric battery modules and eliminating the heat-transfer fluid outside of the casing.

These ducts for conveying the heat-transfer fluid that are integrated in the walls of the protective casing thus allow the feeding of the heat-transfer fluid to and its elimination from the thermal regulation devices that are arranged in the protective casing and placed in thermal contact with the battery modules.

The heat-transfer fluid flowing in the thermal regulation devices enables the temperature of the battery modules arranged in the enclosure of the casing to be regulated.

The protective casing of the invention fulfils a conventional structural role enabling the battery modules to be protected against the environment outside the casing, plus an additional role of feeding the heat-transfer fluid to the various thermal regulation devices arranged in the protective casing (and of eliminating the heat-transfer fluid outside of these devices).

Figure 1:
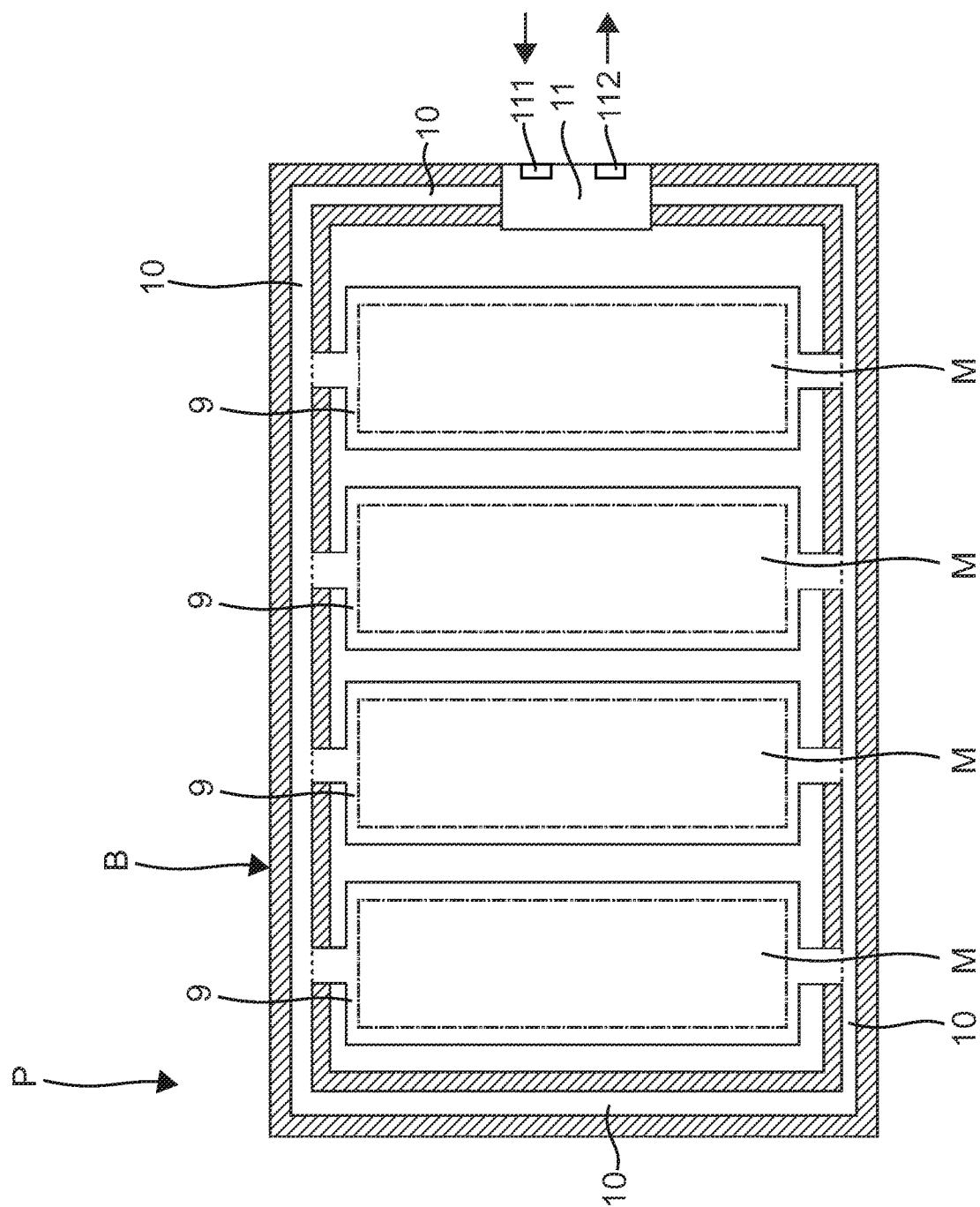

FIG. 1, which schematically illustrates the general principle of the invention, is a view from above, in cross section, of a battery pack P comprising a protective casing B according to the invention in which electric battery modules M are accommodated.

The battery modules M are arranged in thermal contact with thermal regulation elements 9, thereby allowing the temperature thereof to be regulated.

To this end, the thermal regulation elements 9, which together form a thermal regulation device, comprise circuits through which a heat-transfer fluid flows, allowing the exchange of energy between each of the modules M and the corresponding thermal regulation element 9.

With a view to feeding heat-transfer fluid to the thermal regulation elements 9 positioned in the protective casing B, the invention makes provision for the formation of ducts 10 for conveying this fluid within the walls of the protective casing B.

The conveying ducts 10 thus extend in one or more walls of the protective casing B so as to feed and to eliminate the heat-transfer fluid flowing in the flow circuits of the various thermal regulation elements 9.

The protective casing B further comprises a connector 11 having an inlet orifice 111 and an elimination orifice 112, which enables the conveying ducts 10 to be connected with another part of the thermal regulation loop to the protective casing B (comprising a pump for causing the fluid to flow, notably).

FIGS. 2A and 2B are schematic detailed views, in cross section, of a casing 1 for protecting a battery pack according to a first embodiment of the invention.

FIG. 2A shows an electric battery module M resting on a thermal regulation element 9 connected to a duct 10, for conveying the heat-transfer fluid, formed in the protective casing 1.

More precisely, the protective casing 1 is formed from two half-shells 12a, 12b, the particular forms of which make it possible to delimit at least on duct 10 for conveying the heat-transfer fluid within one or more walls of the casing 1.

The forms of the half-shells 12a, 12b also delimit at least one slot 13, which makes it possible to place the conveying duct 10 in fluid connection with a thermal regulation element 9 fixed on the protective casing 1.

More precisely, the slot 13 has dimensions such as, in a sealed manner, to receive an edge of the thermal regulation element 9 and to place the conveying duct 10 in fluid connection with the fluid flow circuit extending in the thermal regulation element 9.

In this example, the first half-shell 12a has a first rectilinear portion 121 extended by a second rectilinear portion 122, which is inclined relative to the first portion 121 and has a rounded portion 123 at its free end, the rounded portion 123 having a lip 124 (expanded view of FIG. 2B).

The second half-shell 12b has a form substantially corresponding to the first half-shell 12a.

It thus has a first rectilinear portion 125 extended by a second rectilinear portion 126, which is inclined relative to the first portion 125 and has a rounded portion 127 at its free end, the rounded portion 127 having a third rectilinear portion 128 extending parallel to the first rectilinear portion 125 (expanded view of FIG. 2B).

Once the half-shells have been assembled (FIG. 2A), the rectilinear portions 121, 122 of the first half-shell 12a come into contact with the rectilinear portions 125, 126 of the second half-shell 12b.

The rounded portions 123, 127 of each of the half-shells 12a, 12b are located facing one another so as to delimit a cavity forming the duct 10 for conveying the heat-transfer fluid.

In this example, the conveying duct 10 has a substantially circular cross section.

The lip 124 of the first half-shell 12a is located facing the third rectilinear portion 128 of the second half-shell 12b so as to form the slot 13 allowing the fixing of the thermal regulation element 9 on the casing 1 and the fluid connection of the thermal regulation element 9 with the conveying duct 10.

The half-shells 12a, 12b are manufactured from plastics, metallic or composite material.

More precisely, the material used for the walls of the casing is chosen so that the latter has sufficient rigidity to protect the battery modules M that it contains.

The half-shells 12a, 12b are secured together in the region of the first 121, 125 and second 122, 126 rectilinear portions of the half-shells 12a, 12b by means of adhesive bonding, by welding or by friction of the two half-shells together until adhesion is achieved.

FIG. 3 is a schematic detailed view, in cross section, of a casing 2 for protecting a battery pack according to a second embodiment of the invention.

In this example, the protective casing 2 is formed by a double shell, or wall, 20 comprising a first half-shell 21 arranged toward the interior of the casing 2 and a second half-shell 22 arranged toward the interior of the protective casing 2.

The first 21 and second 22 half-shells respectively comprise rectilinear grooves 211, 221 with a semi-hexagonal cross section that extend parallel to one another.

The grooves 221 of the first half-shell 21 are located facing the grooves 221 of the second half-shell 22.

Thus, after securing of the half-shells 21, 22 together, the grooves 211, 221 delimit ducts 10, for conveying the heat-transfer fluid, of hexagonal cross section within the double shell 20 of the protective casing.

It should be noted that the conveying ducts 10 therefore have a hexagonal form after securing of the first 21 and second 22 half-shells.

FIG. 4 illustrates a variant of the second embodiment, in which the grooves 211, 221 have a semi-elliptical cross section.

After securing of the two half-shells 21, 22, the conveying ducts 10 thus have an elliptical or oval form.

The groove and duct forms shown in FIGS. 3 and 4 are merely illustrative examples and are non-limiting.

Other forms of groove, and therefore of ducts, may be employed without departing from the general principle of the invention.

For example, the ducts may have a circular, rectangular, triangular or trapezoidal form, for example.

The first 21 and second 22 half-shells are manufactured from plastics, metallic or composite material.

More precisely, the material used for the half-shells of the casing is chosen so that the latter has sufficient rigidity to protect the battery modules M that it contains.

The two half-shells 21 22 are secured together by adhesive bonding, by welding or by friction of the two half-shells 21, 22 together until adhesion is achieved.

Figure 5:
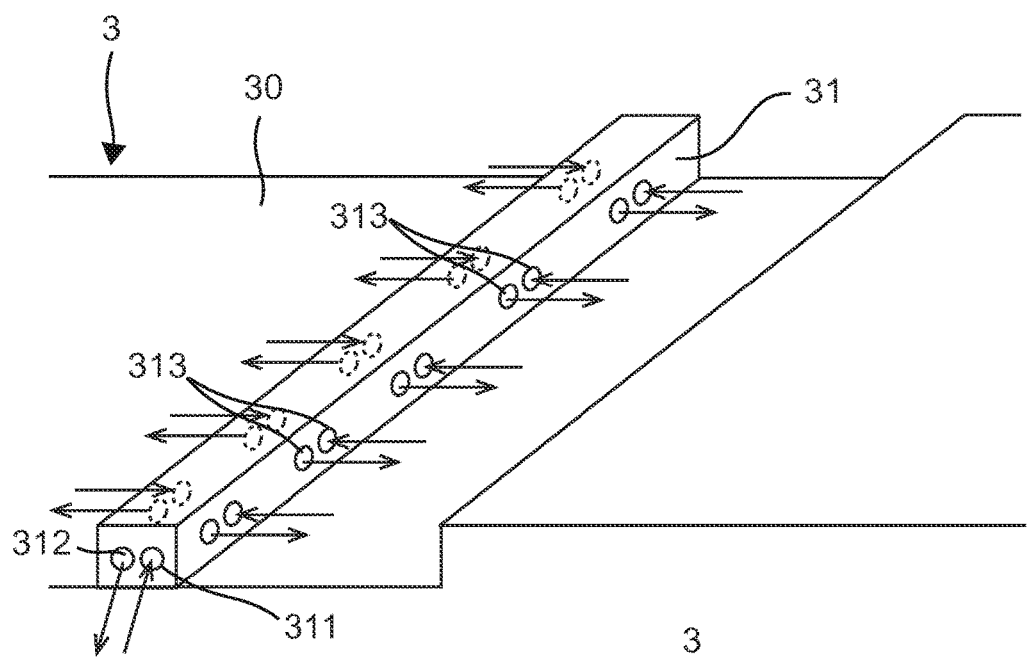
FIG. 5 is a schematic detailed view of a casing for protecting a battery pack according to a third embodiment of the invention.

FIG. 5 is a schematic detailed view of a casing for protecting a battery pack according to a third embodiment of the invention.

According to this particular embodiment, the protective casing 3 is monobloc and the conveying ducts 10 are defined directly in the walls of the casing 3, at the time of the manufacture thereof.

In this example, the protective casing 3 comprises, on at least one of its walls, a profile 31 projecting from the interior surface of the wall 30 (i.e. the surface of the wall oriented toward the interior of the casing).

The ducts 10 (not visible) for conveying the heat-transfer fluid are formed within this profile 31.

An inlet, or feed, orifice 311 and an outlet, or elimination, orifice 312 are formed at one end of the conveying ducts 10 so as to allow the feed and elimination of the heat-transfer fluid.

The profile 31 also has a plurality of pairs of openings 313 (designed for the inlet and outlet of the fluid, respectively) arranged all along the profile 31 so as to allow the connection of the thermal regulation elements 9 to the conveying ducts 10 integrated in the casing 3.

It should be noted that, in FIG. 5, the profile 31 comprises a feed duct 10 and an elimination duct 10 for the heat-transfer fluid communicating, respectively, with the inlet orifice 311 and the elimination orifice 312 respectively.

In the example illustrated, the ducts 10 allow conveying of the heat-transfer fluid to ten thermal regulation elements 9 (not shown), which are each connected with a pair of openings 313.

In the case in point, five thermal regulation elements 9 are connected on either side of the profile 31 integrating the conveying ducts 10, that is to say ten thermal regulation elements in total.

Figure 6:
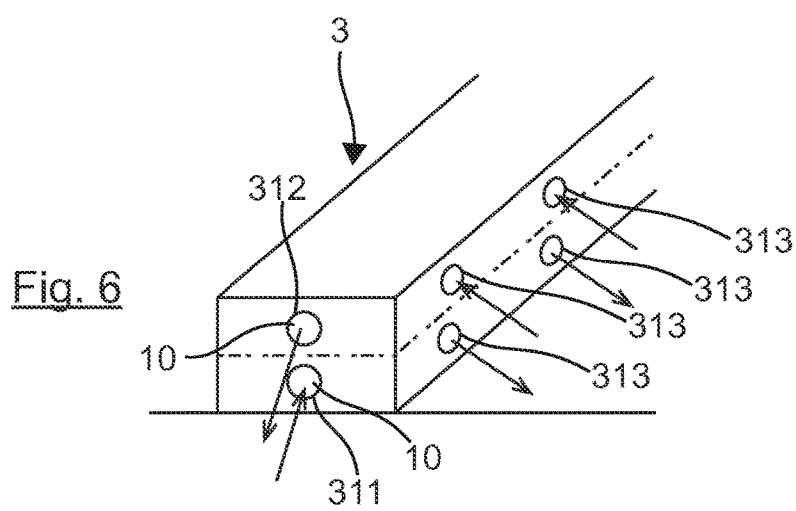
FIG. 6 is a perspective view illustrating a variant of the protective casing of FIG. 5.

FIG. 6 illustrates a variant of the protective casing 3 of FIG. 5 in the sense that the feed duct 10 and the elimination duct 10 for the heat-transfer fluid are superposed. A plurality of pairs of top and bottom openings 313 (designed for the inlet and outlet of the fluid, respectively) are arranged all along the profile 31 so as to allow the connection of the thermal regulation elements 9 to the conveying ducts 10 integrated in the casing 3.

Figure 7:
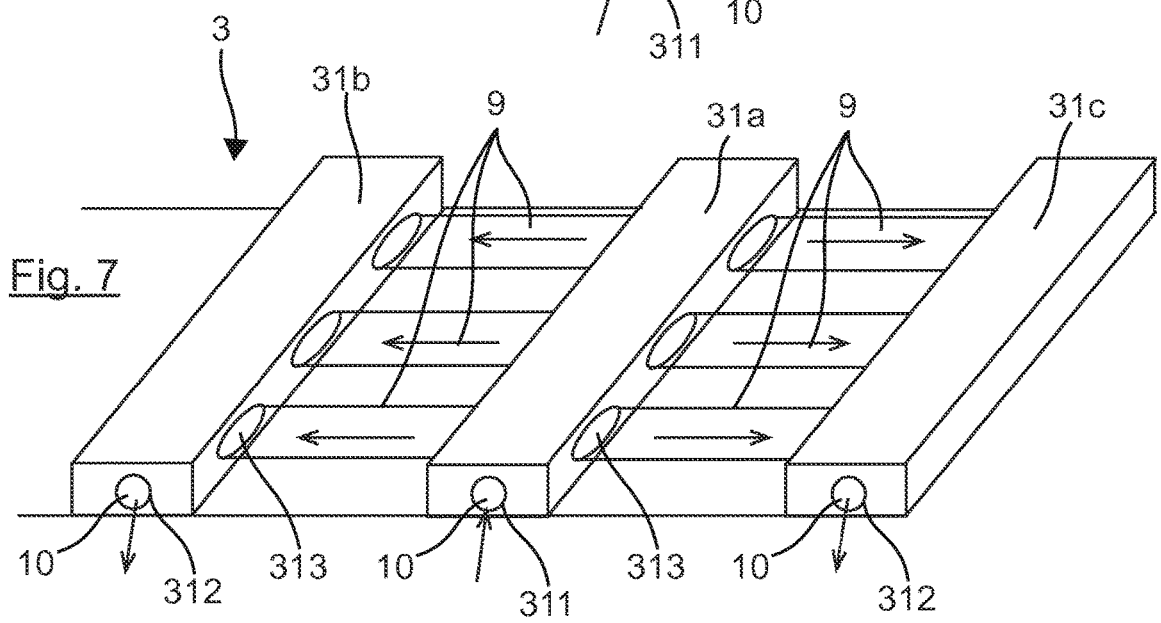
FIG. 7 is a perspective view illustrating another variant of the protective casing of FIG. 5.

FIG. 7 illustrates another variant of the protective casing 3 of FIG. 5 in the sense that it comprises three profiles 31 spaced in one and the same plane and each having a single conveying duct 10.

In this example, the central profile 31a comprises an inlet orifice, or feed orifice, 311, which enables the thermal regulation elements 9 located on either side of the profile 31a to be fed with heat-transfer fluid.

The thermal regulation elements 9 are in fluid connection with the central profile 31a by means of the openings 313 formed on the lateral walls of the profile 31.

The two lateral profiles 31b, 31c are located on each side of the central profile 31a and are designed to eliminate the heat-transfer fluid that has run through the thermal regulation elements 9.

To this end, each of the lateral profiles 31b, 31c comprises, on a lateral edge, opening 313 into which the thermal regulation elements 9 open out, and an elimination orifice 312, for the heat-transfer fluid, located at the end of the conveying duct 10.

The various monobloc protective casings 3 described in connection with FIGS. 5 to 7 are manufactured, for example, using a three-dimensional printing process, the conveying ducts being formed during this printing step.

In a variant, the monobloc casings 3 are manufactured by pultrusion, by lost wax molding, by gas injection, or by any other suitable process.

Preferably, the monobloc protective casing 3 is manufactured from plastics, metallic or composite material.

More precisely, the material used for the casing is chosen so as to have sufficient rigidity to protect the battery modules M that it contains.

FIGS. 8 and 9 schematically illustrate a casing for protecting a battery pack according to a fourth embodiment of the invention.

According to this particular embodiment, the protective casing 4 integrates, within its walls, a network of cylindrical conduits designed to distribute the heat-transfer fluid to the thermal regulation elements 9 and to eliminate the heat-transfer fluid.

FIG. 8 is a transverse sectional view of the casing 4, illustrating the walls 41 of the protective casing 4 in which the cylindrical conduits 42 are integrated.

The conduits 42 extend in a rectilinear fashion in the walls 41 and delimit ducts 10 for conveying the heat-transfer fluid.

With a view to distributing the heat-transfer fluid from the conveying ducts 10 to the thermal regulation elements 9, openings 411 are formed in the walls 41 so as to place the thermal regulation elements 9 in fluid connection with the ducts 10 (FIG. 9).

The protective casing 4 is manufactured from plastics, metallic or composite material.

More precisely, the material used for the casing is chosen so that the latter has sufficient rigidity to protect the battery modules M that it contains.

The conduits 42 are added within the walls 41 of the casing 4 by thermoforming or by overmolding.

FIG. 10 illustrates a variant of the protective casing 4 of FIG. 8 in the sense that the conduits 42 coil within the wall 41 of the casing 4 so as to reach and to distribute the heat-transfer fluid to the various thermal regulation elements 9 (and to eliminate the heat-transfer fluid also).

The integration of the conduits 42 in the thickness of the walls 41 of the protective casing 4 makes it possible to avoid leakage of heat-transfer fluid in the interior enclosure of the protective casing 4 and the destruction of the battery modules M.

Other Aspects and Variants

The invention thus proposes to integrate the ducts for conveying the heat-transfer fluid inside the walls of the protective casing in which the electric battery modules M are accommodated.

Thus, the casing makes it possible, on the one hand, to protect the battery modules M from impacts and, on the other hand, to convey the heat-transfer fluid to the thermal regulation elements employed in the interior space of the casing and arranged in thermal contact with the modules such as to regulate the temperature thereof.

In other words, the invention integrates management of the heat-transfer fluid actually within the structure of the protective casing.

The structure of the casing and the ducts for conveying the heat-transfer fluid cannot thus be dissociated.

To this end, the invention proposes creating the conveying ducts either:
- by assembling various complementary parts/portions of the protective casing (half-shells, in the case in point);
- directly at the time of manufacture of the protective casing, by means of processes such as three-dimensional (3D) printing, lost wax molding, gas injection or pultrusion;
- by integrating conduits in the walls of the protective casing, by means of thermoforming or overmolding of the conduits.

The invention makes it possible to implement a network of ducts for conveying the heat-transfer fluid within the walls of the protective casing, allowing the thermal regulation elements to be fed with heat-transfer fluid, and then eliminating the heat-transfer fluid that has run through the thermal regulation elements.

The embodiments described above are provided merely as illustrative examples and are non-limiting.

Although not described, other variants or a combination of some of these embodiments together cannot be ruled out.

It should be noted that the invention makes it possible to reduce the number of components needed to manage the heat-transfer fluid.

Indeed, as the circuit for conveying the heat-transfer fluid is integrated in the walls of the protective casing, there is no longer a need to employ a network of pipes inside or outside the casing for conveying the heat-transfer fluid to the thermal regulation elements in the protective casing.

The weight on board the vehicle is thereby reduced, which makes it possible to optimize the performance levels (range and power, notably) of the hybrid or electric vehicle.

Furthermore, the invention permits a reduction in the likelihood of leakage of the heat-transfer fluid in the protective casing in which the battery modules are accommodated.

It should be noted that the ducts for conveying the heat-transfer fluid may be implemented on a single wall or on a plurality of walls of the casing.

The ducts may thus be integrated in the bottom wall, the lateral walls and/or the cover of the protective casing.

It should also be noted that the thermal regulation elements may take the form of plate or tube heat exchangers arranged in the enclosure of the casing, or the form of an arrangement of heat-transfer-fluid flow tubes or ducts integrated directly in the wall or walls of the casing.

It should furthermore be noted that the walls of the protective casing are manufactured from a material that offers good mechanical performance/strength for optimal weight.

Thus the protective casing walls provide good protection for the battery modules accommodated therein against impacts (crashes).

Without limitation, this type of protective casing may be used in any type of vehicle in the field of transportation, but also in construction, industry and the tertiary sector, where electric batteries are contained in a casing and cooled directly or indirectly by a fluid.

The invention claimed is:

1. A casing for protecting at least one electric battery module, comprising:

at least one element for thermal regulation of said at least one module in which a heat-transfer fluid flows; and at least one duct, for conveying the heat-transfer fluid, that extends in at least one wall of the protective casing and is in fluid connection with said at least one thermal regulation element, wherein walls of the casing are formed from two half-shells, which delimit said at least one conveying duct, wherein the two half-shells include at least one slot for receiving an edge of said at least one thermal regulation element, forming a fluid connection between said at least one thermal regulation element and said at least one conveying duct.

2. The protective casing as claimed in claim 1, wherein said two half-shells are secured by welding, adhesive bonding or friction of said two half-shells together until adhesion is achieved.

3. The protective casing as claimed in claim 1, wherein a first half-shell comprises at least one groove and a second half-shell comprises at least one groove, said grooves being arranged such that they face one another and delimiting said at least one conveying duct.

4. A battery pack for a hybrid or electric vehicle, comprising:

a protective casing, in which is accommodated at least one electric battery module thermally regulated by at least one thermal regulation element, the protective casing comprising at least one duct for conveying heat-transfer fluid that extends in at least one wall of the protective casing and is in fluid connection with said at least one thermal regulation element, wherein walls of the protective casing are formed from two half-shells, which delimit said at least one duct, and wherein the two half-shells include at least one slot for receiving an edge of said at least one thermal regulation element, forming a fluid connection between said at least one thermal regulation element and said at least one duct.

* * * * *